(12) United States Patent
Izumi

(10) Patent No.: US 10,792,758 B2
(45) Date of Patent: Oct. 6, 2020

(54) LASER MACHINING DEVICE FOR CORRECTING PROCESSING CONDITIONS BEFORE LASER MACHINING BASED ON CONTAMINATION LEVEL OF OPTICAL SYSTEM

(71) Applicant: FANUC CORPORATION, Yamanashi (JP)

(72) Inventor: Takashi Izumi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 37 days.

(21) Appl. No.: 16/129,239

(22) Filed: Sep. 12, 2018

(65) Prior Publication Data
US 2019/0076958 A1    Mar. 14, 2019

(30) Foreign Application Priority Data
Sep. 14, 2017  (JP) ................................. 2017-177057

(51) Int. Cl.
*B23K 26/046*   (2014.01)
*B23K 26/06*    (2014.01)
*B23K 26/70*    (2014.01)

(52) U.S. Cl.
CPC ........ *B23K 26/046* (2013.01); *B23K 26/0626* (2013.01); *B23K 26/0643* (2013.01);
(Continued)

(58) Field of Classification Search
CPC .. B23K 26/144; B23K 26/342; B23K 26/147; B23K 15/02; B23K 26/083; B23K 15/0086; B23K 26/0643; B23K 26/0648; B23K 26/046; B23K 26/706; B23K 26/0626; B23K 26/707; B22F 33/008;
(Continued)

(56) References Cited

U.S. PATENT DOCUMENTS 4,689,467 A  *  8/1987  Inoue ..................... B23K 10/00
                                                219/121.6
4,848,879 A  *  7/1989  Nishimura ............ G02F 1/0147
                                                    359/289
(Continued)

FOREIGN PATENT DOCUMENTS

CN    101142049 A    3/2008
CN    105598580 A    5/2016
(Continued)

*Primary Examiner* — Eric S Stapleton
(74) *Attorney, Agent, or Firm* — RatnerPrestia

(57) ABSTRACT

A laser machining device includes a storage unit configured to store a reference value based on an energy amount of returning light when laser light is emitted, in a state where external optical system is not contaminated, toward a reflection plate with a predetermined output low enough not to melt or deform the reflection plate such that a focus position of the laser light aligns with a predetermined position, and a processing condition correction unit configured to correct, prior to laser machining, a processing condition in accordance with the contamination level of the external optical system, wherein the processing condition correction unit includes a laser power correction section configured to correct a laser power of the processing condition based on the measurement value measured by a returning light measurement unit and the reference value.

7 Claims, 10 Drawing Sheets

(52) U.S. Cl.
CPC ........ *B23K 26/0648* (2013.01); *B23K 26/706* (2015.10); *B23K 26/707* (2015.10)

(58) Field of Classification Search
CPC ............... B22F 3/1055; B22F 2999/00; B22F 2003/1056; B22F 2003/1057; B22F 3/005; B29C 31/02; B29C 64/20; B29C 64/165; B05C 19/04; B65G 33/08; B65G 37/00; B65G 47/19; B65G 65/30; B65G 49/00; B33Y 40/00; B33Y 30/00; Y02P 10/295
USPC .................................................... 219/121.6
See application file for complete search history.

(56) References Cited

U.S. PATENT DOCUMENTS

| | | | | |
|---|---|---|---|---|
| 4,900,695 A * | 2/1990 | Takahashi | ............. | H01L 21/768 250/492.2 |
| 4,942,284 A * | 7/1990 | Etcheparre | ......... | B23K 26/1476 219/121.67 |
| 5,061,839 A * | 10/1991 | Matsuno | ............... | B23K 26/046 219/121.75 |
| 5,207,673 A * | 5/1993 | Ebling | ................... | A61B 18/24 385/33 |
| 5,218,609 A * | 6/1993 | Oda | ........................ | H01S 3/115 372/10 |
| 5,243,614 A * | 9/1993 | Wakata | ..................... | G01J 3/02 372/28 |
| 5,245,682 A * | 9/1993 | Ortiz, Jr. | .................. | G02B 6/32 385/33 |
| 5,276,697 A * | 1/1994 | Davis | ................. | H01S 5/06825 372/26 |
| 5,298,716 A * | 3/1994 | Ogawa | ................. | B23K 26/046 219/121.67 |
| 5,332,881 A * | 7/1994 | Topkaya | ............. | B23K 26/046 219/121.75 |
| 5,473,409 A * | 12/1995 | Takeda | ................ | G03F 7/70575 355/53 |
| 5,607,606 A * | 3/1997 | Mori | .................... | B23K 26/046 219/121.67 |
| 5,625,609 A * | 4/1997 | Latta | ...................... | G11B 7/005 369/44.23 |
| 5,667,707 A * | 9/1997 | Klingel | ................ | B23K 26/046 219/121.67 |
| 5,815,626 A * | 9/1998 | Kuba | ...................... | A61B 18/22 385/124 |
| 6,011,612 A * | 1/2000 | Go | ...................... | G03F 7/70058 250/341.4 |
| 6,124,565 A * | 9/2000 | Morishita | .......... | B23K 26/1476 219/121.67 |
| 6,137,633 A * | 10/2000 | Tanaka | .................... | B23K 26/06 359/619 |
| 6,204,473 B1 * | 3/2001 | Legge | ................. | B23K 26/1476 219/121.67 |
| 6,243,406 B1 * | 6/2001 | Heist | ................... | G03F 7/70025 372/57 |
| 6,310,727 B1 * | 10/2001 | Tanaka | ................... | G02B 27/09 359/624 |
| 6,381,078 B1 * | 4/2002 | Yamaguchi | .............. | B41J 2/473 347/233 |
| 6,392,684 B1 * | 5/2002 | Tanimoto | ................. | B41J 2/473 347/234 |
| 6,392,810 B1 * | 5/2002 | Tanaka | ............. | G02B 27/0905 359/622 |
| 6,403,966 B1 * | 6/2002 | Oka | ....................... | G02B 21/16 250/372 |
| 6,483,071 B1 * | 11/2002 | Hunter | .................. | B23K 26/04 219/121.6 |
| 6,573,162 B2 * | 6/2003 | Tanaka | ............. | B23K 26/0604 438/487 |
| 6,628,371 B1 * | 9/2003 | Ishikawa | ................ | G03B 27/72 250/492.2 |
| 6,753,253 B1 * | 6/2004 | Takahashi | ............. | H01J 37/304 257/E21.295 |
| 6,777,641 B2 * | 8/2004 | Cole, III | ................ | B23K 26/04 219/121.67 |
| 6,813,004 B1 * | 11/2004 | Horikoshi | ........... | G03F 7/70558 250/492.2 |
| 6,818,568 B2 * | 11/2004 | Tanaka | ............... | G02B 27/0905 438/166 |
| 6,822,187 B1 * | 11/2004 | Hermann | ........... | B23K 26/0884 219/121.63 |
| 6,872,910 B2 * | 3/2005 | Tanaka | ............... | B23K 26/0604 219/121.6 |
| 6,927,109 B1 * | 8/2005 | Tanaka | ............... | B23K 26/0604 438/166 |
| 6,989,524 B2 * | 1/2006 | Yamazaki | .......... | B23K 26/0604 250/216 |
| 7,015,418 B2 * | 3/2006 | Cahill | .................... | B23K 26/04 219/121.69 |
| 7,067,763 B2 * | 6/2006 | Schramm | ............... | B23K 26/04 219/121.69 |
| 7,119,351 B2 * | 10/2006 | Woelki | .................... | B23K 26/04 250/559.4 |
| 7,363,180 B2 * | 4/2008 | Swaringen | ............. | B23K 26/04 702/85 |
| 7,745,756 B2 * | 6/2010 | Yamazaki | ....... | B23K 26/0876 219/121.6 |
| 7,759,602 B2 * | 7/2010 | Mori | .................... | B23K 26/142 219/121.63 |
| 7,778,292 B2 * | 8/2010 | Suzuki | ................. | B23K 26/034 372/22 |
| 7,786,404 B2 * | 8/2010 | Menin | ................. | B23K 26/0884 219/121.63 |
| 8,084,713 B2 * | 12/2011 | Idaka | .................... | B23K 26/03 219/121.83 |
| 8,121,717 B2 * | 2/2012 | Idaka | .................. | G05B 19/4086 700/98 |
| 8,153,931 B2 * | 4/2012 | Yamakawa | ............ | B23K 26/03 219/121.81 |
| 8,235,296 B2 * | 8/2012 | Idaka | .................. | G06K 19/00 219/121.6 |
| 8,515,701 B2 * | 8/2013 | Swaringen | ............. | B23K 26/04 702/85 |
| 8,890,917 B2 * | 11/2014 | Matsuda | ............... | G06F 3/1208 347/110 |
| 8,895,345 B2 * | 11/2014 | Akiyama | ............. | B28D 5/0005 438/68 |
| 8,947,485 B2 * | 2/2015 | Hasegawa | ............... | B41J 2/4753 347/231 |
| 9,012,806 B2 * | 4/2015 | Hayashi | ............. | B23K 26/0626 219/121.62 |
| 9,703,111 B2 * | 7/2017 | Miyazaki | ........... | B23K 26/0648 |
| 9,776,280 B2 * | 10/2017 | Ogura | ................... | B23K 26/032 |
| 10,232,470 B2 * | 3/2019 | Sokol | .................... | B23K 26/356 |
| 2001/0005606 A1 * | 6/2001 | Tanaka | ................. | B23K 26/0604 438/151 |
| 2002/0125232 A1 * | 9/2002 | Choo | .................... | B23K 26/046 219/121.69 |
| 2002/0136971 A1 * | 9/2002 | Ito | ......................... | B23K 26/04 430/22 |
| 2004/0252740 A1 * | 12/2004 | Albrecht | ............... | G02B 5/1814 372/55 |
| 2005/0087747 A1 * | 4/2005 | Yamada | ................... | G02B 6/43 257/80 |
| 2005/0115940 A1 * | 6/2005 | Matsushita | ........... | G01J 1/4257 219/121.83 |
| 2005/0221203 A1 * | 10/2005 | Fujii | ................ | H01L 21/28008 430/5 |
| 2005/0263507 A1 * | 12/2005 | Yamazaki | ............. | B23K 26/04 219/121.83 |
| 2005/0272185 A1 * | 12/2005 | Seki | ........................ | C30B 13/24 438/149 |
| 2005/0282364 A1 * | 12/2005 | Seki | ........................ | B23K 26/03 438/479 |
| 2005/0286598 A1 * | 12/2005 | Sandstrom | .......... | G03F 7/70025 372/55 |

(56) References Cited

U.S. PATENT DOCUMENTS

| | | | |
|---|---|---|---|
| 2006/0055993 A1* | 3/2006 | Kobayashi | G03H 1/02 359/3 |
| 2006/0121745 A1* | 6/2006 | Fujii | H01L 21/288 438/790 |
| 2006/0138351 A1* | 6/2006 | Jyumonji | B23K 26/03 250/492.2 |
| 2006/0166411 A1* | 7/2006 | Morisue | H01L 27/14621 438/149 |
| 2006/0194354 A1* | 8/2006 | Okumura | H01L 21/02678 438/16 |
| 2007/0026580 A1* | 2/2007 | Fujii | H01L 21/0271 438/149 |
| 2007/0031993 A1* | 2/2007 | Nemets | B23K 26/04 438/110 |
| 2007/0082443 A1* | 4/2007 | Yamazaki | H01L 29/66765 438/244 |
| 2007/0100492 A1* | 5/2007 | Idaka | G05B 19/4086 700/166 |
| 2007/0104417 A1* | 5/2007 | Tanaka | H04Q 11/0005 385/16 |
| 2007/0138146 A1* | 6/2007 | Takami | B23K 26/0622 219/121.6 |
| 2007/0159682 A1* | 7/2007 | Tanaka | H04Q 11/0005 359/320 |
| 2007/0207274 A1* | 9/2007 | Fujii | C03C 17/42 427/532 |
| 2007/0278194 A1* | 12/2007 | Hoelsher | G02B 6/4296 219/121.6 |
| 2008/0017619 A1* | 1/2008 | Yamakawa | B23K 26/03 219/121.81 |
| 2008/0019412 A1* | 1/2008 | Ishibashi | G02B 6/4206 372/101 |
| 2008/0023455 A1* | 1/2008 | Idaka | B23K 26/082 219/121.73 |
| 2008/0042288 A1* | 2/2008 | Yamazaki | H01L 21/288 257/759 |
| 2008/0044744 A1* | 2/2008 | Yamazaki | H01L 27/1288 430/5 |
| 2008/0050851 A1* | 2/2008 | Tanaka | H01L 21/76802 438/29 |
| 2008/0057718 A1* | 3/2008 | Omata | B23K 26/0676 438/694 |
| 2008/0073573 A1* | 3/2008 | Takami | B23K 26/04 250/492.2 |
| 2008/0099759 A1* | 5/2008 | Fujii | H01L 51/0022 257/40 |
| 2008/0105875 A1* | 5/2008 | Maekawa | G03F 7/70791 257/72 |
| 2008/0182207 A1* | 7/2008 | Yamazaki | H01L 27/1288 430/311 |
| 2008/0182349 A1* | 7/2008 | Yamazaki | H01L 27/1214 438/29 |
| 2008/0223839 A1* | 9/2008 | Maruyama | B23K 26/03 219/121.83 |
| 2008/0227232 A1* | 9/2008 | Yamazaki | G02F 1/136286 438/34 |
| 2009/0009739 A1* | 1/2009 | Kosugi | G03B 27/42 355/53 |
| 2009/0078939 A1* | 3/2009 | Yamazaki | H01L 21/67144 257/59 |
| 2009/0098710 A1* | 4/2009 | Yamazaki | H01L 21/268 438/458 |
| 2009/0214962 A1* | 8/2009 | Mishima | G03B 27/44 430/30 |
| 2009/0262340 A1* | 10/2009 | Moribe | G01N 21/956 356/237.4 |
| 2010/0009550 A1* | 1/2010 | Tsujikawa | B23K 26/0604 438/798 |
| 2010/0072182 A1* | 3/2010 | Caristan | B23K 26/0604 219/121.72 |
| 2010/0096370 A1* | 4/2010 | Yamazaki | B23K 26/046 219/121.67 |
| 2010/0108913 A1* | 5/2010 | Ershov | H01S 3/225 250/492.1 |
| 2010/0150591 A1* | 6/2010 | Yamashita | B41J 2/473 399/51 |
| 2010/0282725 A1* | 11/2010 | Johnson | B23K 26/0648 219/121.67 |
| 2011/0024404 A1* | 2/2011 | Belletti | B23K 26/0648 219/121.67 |
| 2011/0026016 A1* | 2/2011 | Kawazoe | B23K 26/032 356/237.1 |
| 2011/0028951 A1* | 2/2011 | Raksi | A61F 9/008 606/4 |
| 2011/0042360 A1* | 2/2011 | Takahashi | B23K 26/046 219/121.62 |
| 2011/0056921 A1* | 3/2011 | Belletti | B23K 26/1476 219/121.67 |
| 2011/0141865 A1* | 6/2011 | Senekerimyan | G01J 1/429 369/47.15 |
| 2011/0240619 A1* | 10/2011 | Hayashi | B23K 26/0626 219/121.85 |
| 2011/0241571 A1* | 10/2011 | Maeda | H01S 5/042 315/307 |
| 2012/0007933 A1* | 1/2012 | Yamashita | G03G 15/04072 347/118 |
| 2012/0127184 A1* | 5/2012 | Satoh | H04N 9/3129 345/530 |
| 2012/0182374 A1* | 7/2012 | Matsuda | G06F 3/1208 347/225 |
| 2013/0176602 A1* | 7/2013 | Miyake | G02B 26/0825 358/474 |
| 2013/0200052 A1* | 8/2013 | Wittwer | B23K 26/046 219/121.75 |
| 2015/0246413 A1* | 9/2015 | Kawakita | B23K 31/125 219/121.64 |
| 2015/0369651 A1* | 12/2015 | Nakajima | G01H 9/002 73/655 |
| 2015/0373823 A1* | 12/2015 | Urakawa | H05G 2/00 378/119 |
| 2016/0136756 A1* | 5/2016 | Ogura | B23K 26/032 219/121.62 |
| 2016/0191163 A1* | 6/2016 | Preston | G01B 11/161 398/16 |
| 2016/0248214 A1* | 8/2016 | Kurosu | H01S 3/09702 |
| 2016/0344158 A1* | 11/2016 | Onose | H01S 3/10015 |
| 2016/0349525 A1* | 12/2016 | Miyazaki | B23K 26/0648 |

FOREIGN PATENT DOCUMENTS

| | | |
|---|---|---|
| EP | 2405306 A1 | 1/2012 |
| JP | H05322645 A | 12/1993 |
| JP | H07155971 A | 6/1995 |
| JP | 2005-334928 A | 12/2005 |
| JP | 2016-002580 A | 1/2016 |
| JP | 2016097412 A | 5/2016 |

\* cited by examiner

LASER MACHINING DEVICE FOR CORRECTING PROCESSING CONDITIONS BEFORE LASER MACHINING BASED ON CONTAMINATION LEVEL OF OPTICAL SYSTEM

CROSS-REFERENCE TO RELATED APPLICATION

This application is a new U.S. Patent Application that claims benefit of Japanese Patent Application No. 2017-177057, filed Sep. 14, 2017, the disclosure of this application is being incorporated herein by reference in its entirety for all purposes.

BACKGROUND OF THE INVENTION

1. Field of the Invention

The present invention relates to a laser machining device, and more particularly relates to a laser machining device that corrects processing conditions before laser machining based on the contamination level of an optical system.

2. Description of the Related Art

Laser machining devices that perform laser machining of workpieces by irradiating the workpieces with laser light focus laser light on a predetermined focus position with a lens, and irradiate the workpieces with the focused laser light. In such a laser machining device, when the external optical system which guides the laser light from the laser oscillator and focuses it on the workpiece surface is contaminated and absorbs the laser light, the curvature changes and the focus position is moved due to what is known as the thermal lens effect. In addition, depending on how it was contaminated, the transmittance of the external optical system also varies. When a change in the focus position and a change in the transmittance occur, machining defects occur such that it is necessary to check whether the external optical system is contaminated. This is an obstacle to automatic operation.

In order to solve such problems, techniques for detecting contamination of external optical systems by attaching a temperature sensor or a scattered light sensor to the external optical systems are known. Although not prior to laser machining, JP 2016-2580 A discloses a laser machining device that is capable of detecting and correcting, after machining, a focus shift caused by the thermal lens effect of an external optical system or the contamination of protective glass. When focus shift occurs due to the thermal lens effect, since the laser irradiation diameter increases, by providing a measurement reference surface having a small aperture, the laser machining device detects and corrects the focus shift based on the level of the radiant light radiated from around the small aperture.

JP 2005-334928 A discloses a laser machining device for automatically adjusting the focus by detecting the reflected light of a laser beam. This laser machining device is provided with a reflection plate for focus position detection and a reflected light detection device configured to detect reflected light reflected by the reflection plate, and adjusts the focus shift resulting from contamination of the machining lens by adjusting the focus position of the laser light in the Z axis direction and detecting blue reflected light with high luminance that occurs when the focus point of the laser light coincides with the surface of the reflection plate.

SUMMARY OF THE INVENTION

The external optical system degrades with time. As a result, loss of laser power occurs at the focus point. As the focus position moves even with minor contamination, this leads to significant degradation in the quality of laser machining. In such cases, it is necessary to promptly replace or clean the optical components. However, when maintenance of optical components is performed after occurrence of machining defects, there is a problem that a large number of defective parts are produced during automatic operation. In contrast, in the method of attaching temperature sensors and scattered light sensors to the external optical system, there are problems in that, as additional equipment is necessary, the device is complicated and the external optical system is heavy, which affects the mechanical performance, and retrofitting cannot be performed. Further, since not all external optical systems are compatible with sensors that can detect contamination, there are times when contamination of the optical system is discovered after machining defects occur.

Accordingly, there is demand for a technique for correcting, prior to laser machining, processing conditions according to the contamination level of an external optical system by using a configuration which can be retrofitted for existing laser machining devices.

An aspect of the present disclosure provides a laser machining device configured to laser machine a workpiece after correcting a processing condition in accordance with a contamination level of an optical system, the laser machining device including: a laser oscillator; an external optical system configured to guide laser light from the laser oscillator and focus the laser light on the surface of a workpiece; a drive control unit configured to move the focus position of the laser light emitted from the external optical system; a reflection plate disposed perpendicularly to an optical axis of the laser light and having a constant reflectance with respect to the laser light; a returning light measurement unit configured to measure an energy amount of returning light reflected by the reflection plate and returning to the laser machining device; a storage unit configured to store a reference value based on the energy amount of the returning light when laser light is emitted, in a state where the external optical system is not contaminated, toward the reflection plate with a predetermined output low enough not to melt or deform the reflection plate such that the focus position of the laser light aligns with a predetermined position; and a processing condition correction unit configured to correct, prior to laser machining, a processing condition in accordance with the contamination level of the external optical system, wherein the processing condition correction unit includes: a drive command section configured to issue, with respect to the drive control unit, a command to align the focus position to a position identical to the predetermined position toward the reflection plate, a low-output command section configured to issue, with respect to the laser oscillator, a command to emit laser light toward the reflection plate with a low output identical to the predetermined output, and a laser power correction section configured to correct the laser power of the processing condition based on the measurement value measured by the returning light measurement unit and the reference value.

Another aspect of the present disclosure provides a laser machining device configured to laser machine a workpiece after correcting a processing condition in accordance with a contamination level of an optical system, the laser machining device including: a laser oscillator; an external optical system configured to guide laser light from the laser oscillator and focus the laser light on the surface of a workpiece; a drive control unit configured to move the focus position of the laser light emitted from the external optical system; a half mirror disposed perpendicularly to an optical axis of the laser light and having a constant reflectance with respect to the laser light; a laser light removal unit configured to remove laser light transmitted through the half mirror; a returning light measurement unit configured to measure an energy amount of returning light reflected by the half mirror and returning to the laser machining device; and a processing condition correction unit configured to correct, prior to laser machining, a processing condition in accordance with the contamination level of the external optical system; wherein the processing condition correction unit includes: a drive command section configured to issue, with respect to the drive control unit, a command to align the focus position to a predetermined position toward the half mirror, a high-output command section configured to issue, with respect to the laser oscillator, a command to emit laser light toward the half mirror with an output high enough to be used for laser machining, a focus movement amount calculation section configured to calculate a focus movement amount based on comparison of a first measurement value measured by the returning light measurement unit within a laser emission initiation period in which the external optical system is not warmed up and a second measurement value measured by the returning light measurement unit within a fixed time elapse period in which the external optical system is warmed up, and a focus position correction section configured to correct the focus position of the processing condition based on the calculated focus movement amount.

Another aspect of the present disclosure provides a laser machining device configured to laser machine a workpiece after correcting a processing condition in accordance with a contamination level of an optical system, the laser machining device including: a laser oscillator; an external optical system configured to guide laser light from the laser oscillator and focus the laser light on the surface of a workpiece; a drive control unit configured to move the focus position of the laser light emitted from the external optical system; a half mirror disposed perpendicularly to an optical axis of the laser light and having a constant reflectance with respect to the laser light; a laser light removal unit configured to remove laser light transmitted through the half mirror; a returning light measurement unit configured to measure an energy amount of returning light reflected by the half mirror and returning to the laser machining device; and a processing condition correction unit configured to correct, prior to laser machining, a processing condition in accordance with the contamination level of the external optical system; wherein the processing condition correction unit includes: a first drive command section configured to issue, with respect to the drive control unit, a command to align the focus position on the surface of the half mirror, a first high-output command section configured to issue, with respect to the laser oscillator, a command to emit laser light toward the half mirror with an output high enough to be used for laser machining, a second drive command section configured to issue, with respect to the drive control unit, a command to move the focus position above and below from the surface of the half mirror, a second high-output command section configured to issue, with respect to the laser oscillator, a command to respectively emit laser light in a state in which the focus position is aligned above and below, a graph generation section configured to generate a graph that includes a first measurement value measured in a state in which the focus position is aligned with the surface of the half mirror and a plurality of second measurement values measured in a state in which the focus position is aligned above and below the surface of the half mirror, a focus movement amount calculation section configured to calculate a focus position from the graph, and calculate a focus movement amount based on a difference between the calculated focus position and the focus position commanded to be aligned on the surface of the half mirror, and a focus position correction section configured to correct the focus position of the processing condition based on the calculated focus movement amount.

DETAILED DESCRIPTION

Figure 1:
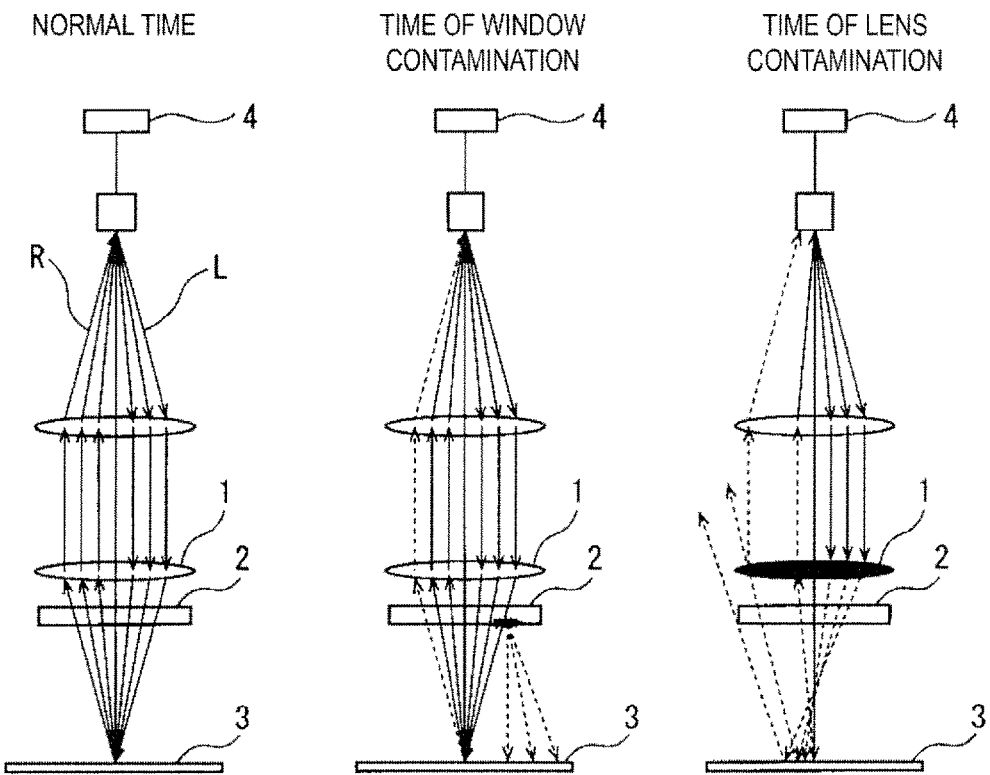
FIG. 1 is a schematic diagram for explaining types of contamination of an external optical system.

Hereinafter, embodiments of the present disclosure will be described in detail with reference to the accompanying drawings. In the drawings, the same or similar reference numerals are given to the same or similar constituent elements. In addition, the embodiments described below do not limit the technical scope of the invention or the meaning of the terms described in the claims.

Definitions of terms in the present specification will be explained. The term "lens" in the present specification refers to an optical component having a surface with curvature. Put differently, the lenses used in the present specification are optical components that have a large change in curvature as a result of what is known as the thermal lens effect when laser light is absorbed due to contamination. In addition, the term "window" in the present specification refers to an optical component including a substantially flat surface. Put differently, the windows used in the present specification are optical components with small changes in curvature even when laser light is absorbed due to contamination. Further, the term "contamination" in the present specification refers not only to a state in which dust has merely accumulated, but also includes states in which accumulated dust is sporadically burned with laser light, or states in which a thin film provided on a mirror or the like peels off and deteriorates.

FIG. 1 is a schematic diagram for explaining types of contamination of an external optical system. The external optical system includes, but is not limited to, a lens 1 for focusing laser light from a laser oscillator on the surface of a workpiece, and a window 2 disposed on the outermost side of the external optical system. In a case in which a focus position is set on the surface of a smooth reflection plate 3 made of copper having a constant reflectance (e.g., 98%) with respect to laser light and is arranged perpendicular to the optical axis of the laser light, and laser light L is emitted from an external optical system at an output (e.g., 10 W) which is low enough not to melt or deform the reflection plate 3, at normal time when the lens 1 and the window 2 are not contaminated, an energy amount of 98% (e.g., 9.8 W) is observed by a returning light measurement unit 4 which measures the energy amount of the returning light R which is reflected by the reflection plate 3 and returns to the inside of the laser machining device. It should be noted that, in FIG. 1, in order to facilitate understanding, the emitted laser light L is depicted on the right side of the optical axis of the laser light, and the returning light R reflected back by the reflection plate 3 is depicted on the left side of the optical axis. At a time of window contamination when only the window 2 is contaminated, as the window 2 absorbs or scatters the laser light L, the energy amount of the returning light measured by the returning light measurement unit 4 decreases. In addition, at a time of lens contamination when only the lens 1 is contaminated, as the focus position moves upward (or downward) due to the thermal lens effect of the lens 1, the energy amount of the returning light R measured by the returning light measurement unit 4 decreases. Further, although not illustrated in the drawings, in cases when both the lens 1 and the window 2 are contaminated, the energy amount of the returning light R measured by the returning light measurement unit 4 is minimized.

Figure 2:
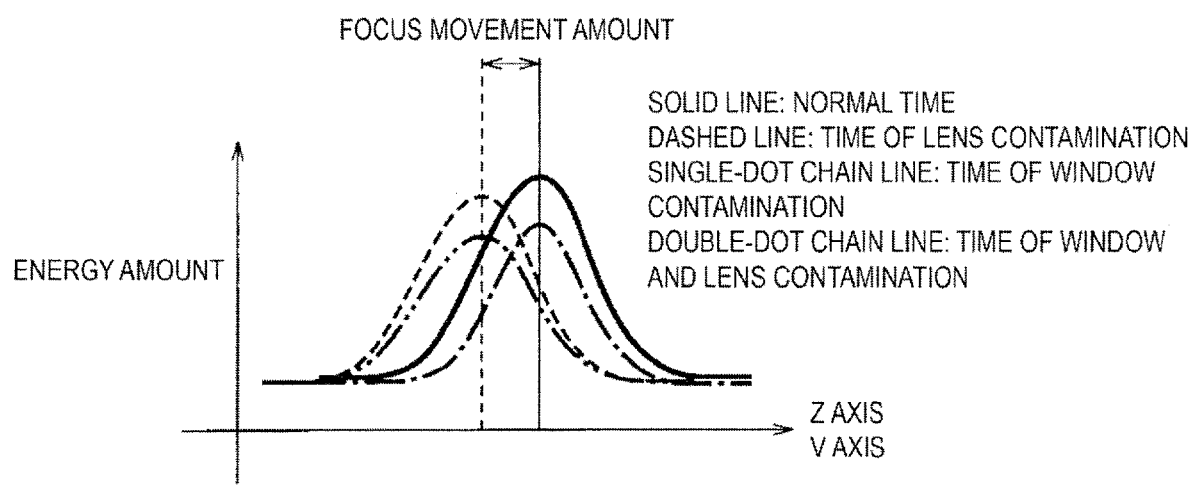
FIG. 2 is a graph illustrating the relationship between the focus movement amount and the energy amount of the returning light based on the type of contamination.

FIG. 2 is a graph illustrating the relationship between the focus movement amount and the energy amount of the returning light based on the type of contamination. As described above, at the time of lens contamination indicated by the dashed line, the focus position moves and the energy amount decreases in comparison with the normal time indicated by the solid line. In addition, at the time of window contamination indicated by the one-dot chain line, although the focus position does not move, the energy amount decreases. Further, at times of lens and window contamination as indicated by the two-dot chain line, the focus position moves and the energy amount is a minimum. However, in cases where laser light is emitted with the focus position aligned above or below the surface of the reflection plate 3, as the focus position may shift closer to the surface of the reflection plate 3, it should be noted that there are cases in which the energy amount of the returning light may rise. In addition, although the thermal lens effect occurs and the focus position moves in states in which the external optical system is warmed up by laser light having an output as high as that used for laser machining, in states where the external optical system is not warmed up, the thermal lens effect does not occur and the focus position does not move even in a case where the lens is contaminated. The laser machining device according to the present embodiment leverages this physical phenomenon to correct the processing conditions according to the contamination level of the external optical system.

Figure 3:
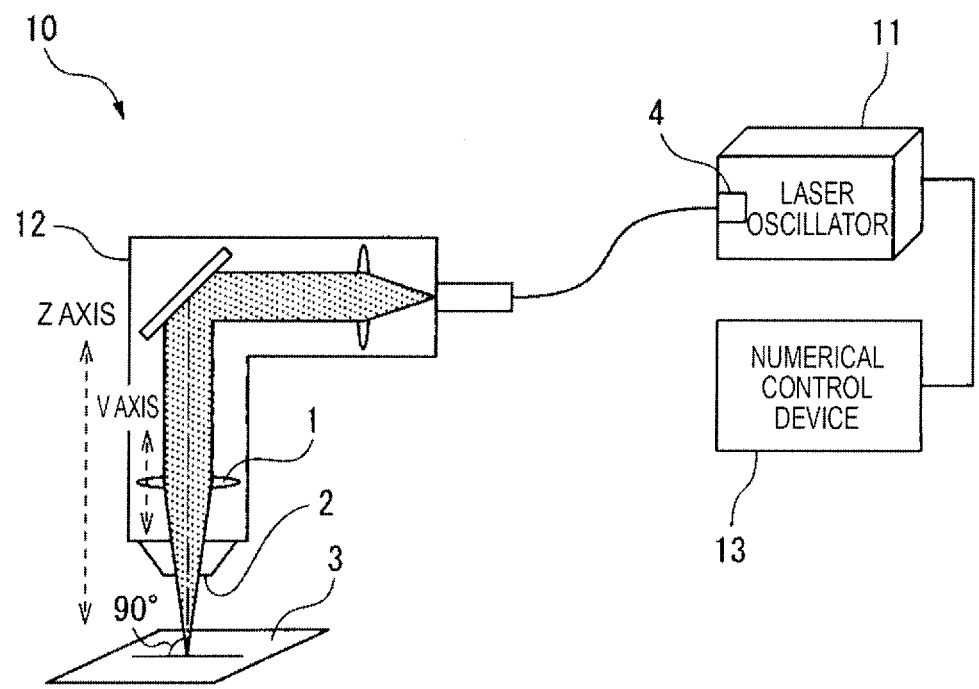
FIG. 3 is a schematic diagram illustrating a schematic configuration of a laser machining device according to an embodiment.

FIG. 3 is a schematic diagram illustrating a schematic configuration of a laser machining device 10 according to the present embodiment. The laser machining device 10 includes a laser oscillator 11, an external optical system 12 for guiding the laser light from the laser oscillator 11 to focus it on the surface of the workpiece, and a numerical controller 13 for controlling the entire laser machining device 10. The laser oscillator 11, is, for example, a fiber laser oscillator with a wavelength from 1060 to 1080 nm. The laser machining device 10 further includes a reflection plate 3 disposed outside of the machining table, and a returning light measurement unit 4 configured to measure the energy amount of returning light reflected by the reflection plate 3 and returning to the laser machining device 10. The reflection plate 3 is, for example, a smooth copper plate which is disposed perpendicular to the optical axis of the laser light and has a constant reflectance (e.g., a reflectance of about 98% with respect to laser light having a wavelength from 1060 to 1080 nm) with respect to the laser light. The returning light measurement unit 4 can use an existing power sensor disposed inside the laser oscillator 11. In this way, the laser machining device 10 does not require an additional sensor.

Figure 4:
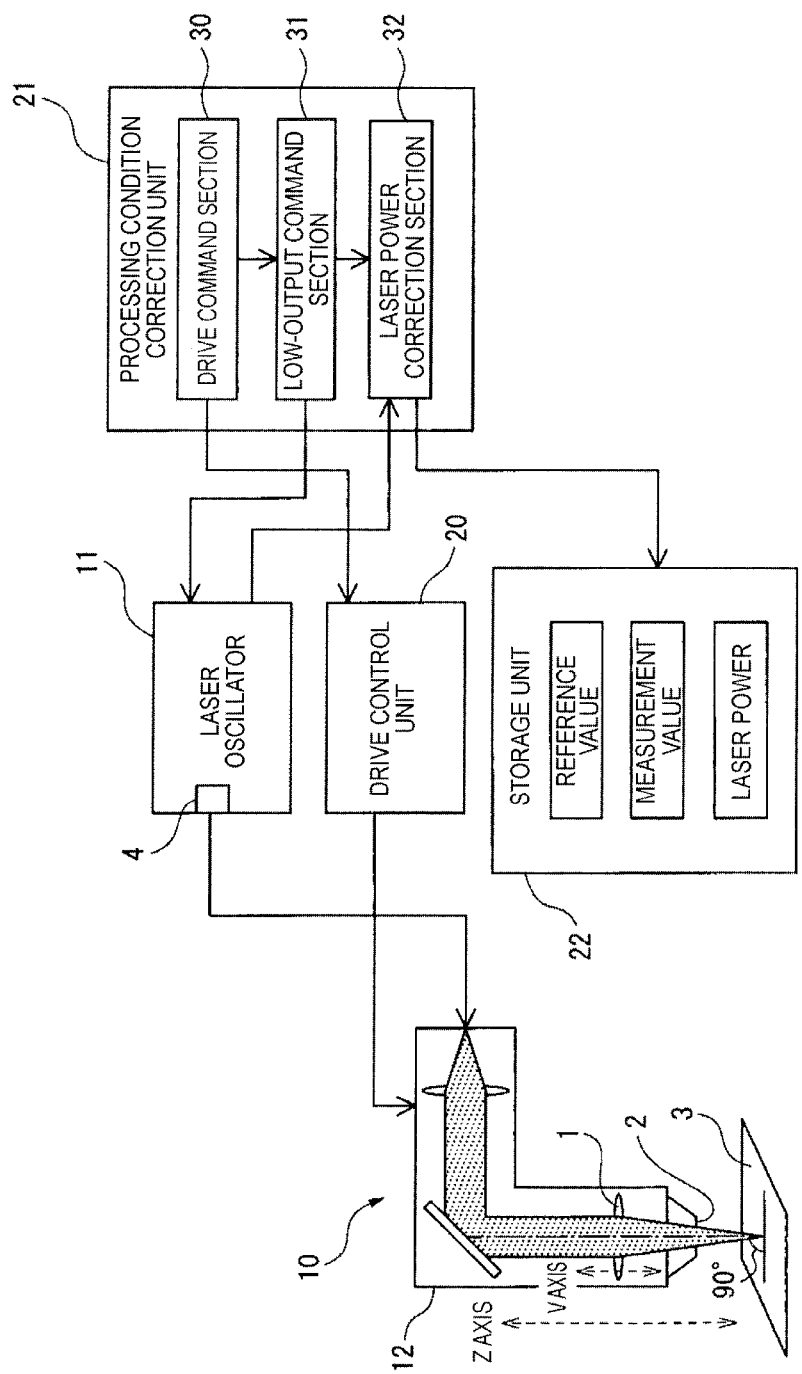
FIG. 4 is a block diagram illustrating a configuration of a laser machining device according to an embodiment.

FIG. 4 is a block diagram illustrating a configuration of the laser machining device 10 according to the present embodiment. The laser machining device 10 further includes a drive control unit 20 configured to move the focus position and the optical axis of the laser light emitted from the external optical system 12, a processing condition correction unit 21 constituted by a semiconductor integrated circuit such as an ASIC, an FPGA or the like, a processor, or a program that can be executed by a computer, and that is configured to correct, prior to laser machining, processing conditions according to the contamination level of the external optical system 12, and a storage unit 22 for storing various types of data. The storage unit 22 is configured to preemptively store a reference value based on the energy amount of the returning light when laser light is emitted, in a state where the external optical system 12 is not contaminated, toward the reflection plate 3 with a predetermined output (e.g., 10 W) low enough not to melt or deform the reflection plate such that the focus position of the laser light aligns with a predetermined position (e.g., +1 mm). The processing condition correction unit 21 includes a drive command section 30 configured to issue, with respect to the drive control unit 20, a command to align the focus position to a position identical to the predetermined position (e.g., +1 mm), an output command unit 31 configured to issue, with respect to the laser oscillator 11, a command to emit laser light toward the reflection plate 3 with a low output (e.g., 10 W) identical to the predetermined output, and a laser power correction section 32 configured to correct the laser power of the processing conditions based on the measurement value measured by the returning light measurement unit 4 and the reference value (e.g., 8 W (=theoretical value 9.8 W×margin α (0.816))) preemptively stored in the storage unit 22.

Figure 5:
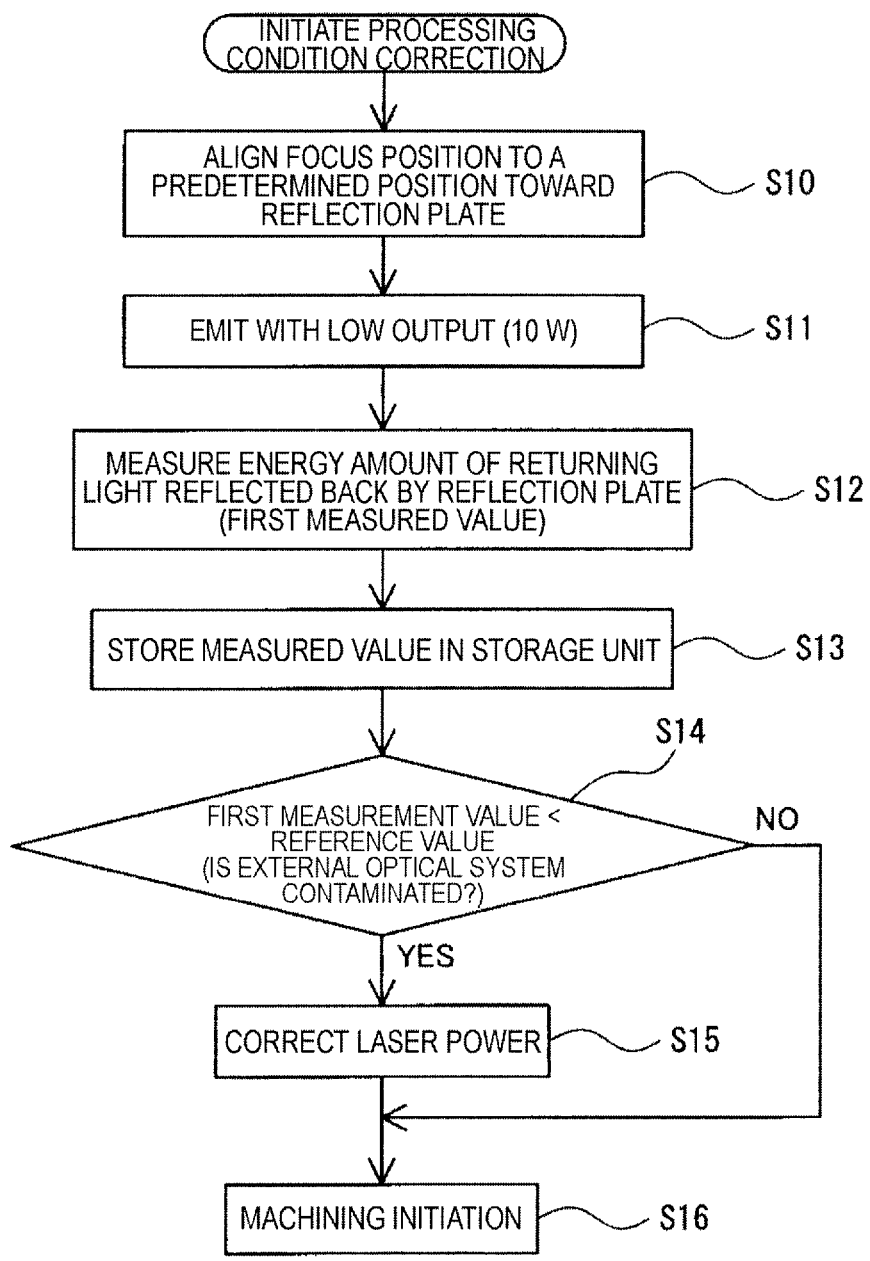
FIG. 5 is a flowchart illustrating the operation of the laser machining device according to one embodiment.

FIG. 5 is a flowchart illustrating the operation of the laser machining device 10 according to the present embodiment. Hereinafter, the process of correcting, prior to laser machining, processing conditions according to the contamination level of the external optical system will be described with reference to FIG. 4 and FIG. 5. When the processing condition correction unit 21 initiates correction of the processing conditions before laser machining, in Step S10, the drive command section 30 issues, with respect to the drive control unit 20, a command to align the focus position (e.g., +1 mm) to a position identical to the predetermined position. In Step S11, the low-output command section 31 issues, with respect to the laser oscillator 11, a command to emit laser light toward the reflection plate 3 with a low output (e.g., 10 W) identical to the predetermined output. In Step S12, the returning light measurement unit 4 measures the energy amount of the returning light reflected by the reflection plate 3 and returning to the laser machining device 10. In Step S13, the storage unit 22 stores the first measurement value. In Step S14, the laser power correction section 32 corrects the laser power of the processing conditions by comparing the measurement value measured by the returning light measurement unit 4 and the reference value stored in the storage unit 22 (i.e., to determine whether the external optical system 12 is contaminated). In Step S14, in cases where the measurement value (e.g., 7.7 W) is less than the reference value (e.g., 8 W) (YES in Step S14), then in Step S15, the laser power correction section 32 corrects the laser power of the processing conditions. For example, in cases where the laser power is 3000 W, it is corrected to 3000 W×9.8 W/7.7 W=3818 W. Next, in Step S16, the laser machining device 10 initiates laser machining. In contrast, in Step S14, in cases where the measurement value (e.g., 8.4 W) is greater than or equal to the reference value (e.g., 8 W) (NO in Step S14), then the laser power of the processing conditions is not corrected, and in Step S16, the laser machining device 10 initiates laser machining. According to the laser machining device 10, the laser power of the processing conditions can be corrected prior to laser machining according to the contamination level of the window 2 by using a configuration that can be retrofitted for existing laser machining devices (such as the reflection plate 3). As a result, as automatic operation can be continued without generating a large number of machining defects, the maintenance period of the external optical system 12 can be prolonged.

Figure 6:
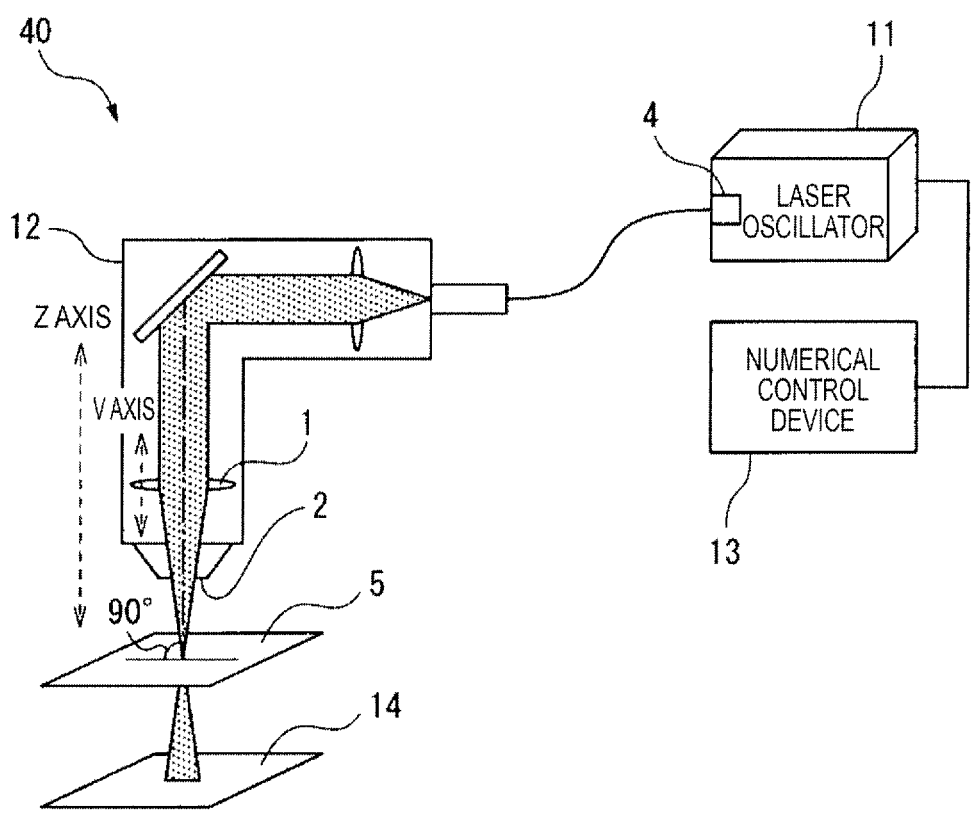
FIG. 6 is a schematic diagram illustrating a schematic configuration of a laser machining device according to another embodiment.

FIG. 6 is a schematic diagram illustrating a schematic configuration of a laser machining device 40 according to another embodiment. The laser machining device 40 is provided with a half mirror 5 in place of the reflection plate 3 and a laser light removal unit 14 configured to remove the laser light transmitted through the half mirror 5, and differs from the laser machining device 10 of FIG. 4 in that it performs correction of the focus position from the energy amount of returning light resulting from emitting laser light with a high output toward the half mirror 5 to purposely warm the external optical system 12 and cause focus shift due to contamination of the lens 1.

The laser machining device 40 includes a laser oscillator 11, an external optical system 12 for guiding the laser light from the laser oscillator 11 to focus it on the surface of the workpiece, and a numerical controller 13 for controlling the entire laser machining device 10. The laser machining device 40 further includes a half mirror 5 disposed outside of the machining table, a laser light removal unit 14 configured to remove the laser light transmitted through the half mirror 5, and a returning light measurement unit configured to measure the energy amount of returning light reflected by the half mirror 5 and returning to the laser machining device 10. The half mirror 5 is, for example, a smooth half mirror which is disposed perpendicular to the optical axis of the laser light and has a constant reflectance (e.g., a reflectance of about 0.5% with respect to laser light having a wavelength from 1060 to 1080 nm, i.e., a transmittance of approximately 99.5%) with respect to the laser light. The laser light removal unit 14 may, for example, be an aluminum plate which is inclined by 45° with respect to the optical axis of the laser light and anodized, or alternatively, an optical system such as a mirror that reflects the laser light elsewhere. The returning light measurement unit 4 can use an existing power sensor disposed inside the laser oscillator 11. In this way, the laser machining device 40 does not require an additional sensor.

Figure 7:
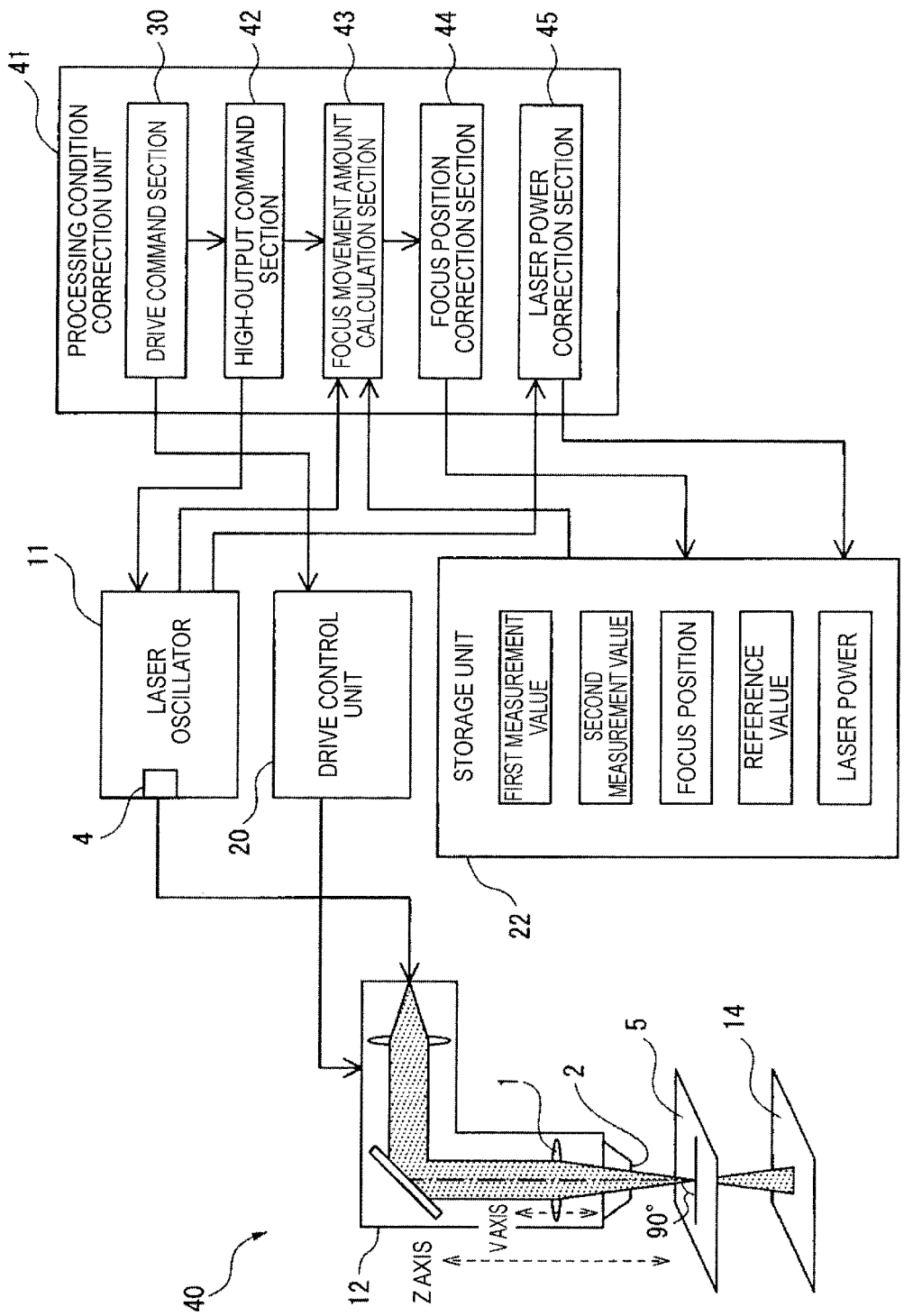
FIG. 7 is a block diagram illustrating a configuration of a laser machining device according to another embodiment.

FIG. 7 is a block diagram illustrating a configuration of the laser machining device 40. The laser machining device 40 further includes a drive control unit 20 configured to move the focus position and the optical axis of the laser light emitted from the external optical system 12, a processing condition correction unit 41 constituted by a semiconductor integrated circuit such as an ASIC, an FPGA or the like, a processor, or a program that can be executed by a computer, and that is configured to correct, prior to laser machining, processing conditions according to the contamination level of the external optical system 12, and a storage unit 22 for storing various types of data. The processing condition correction unit 41 includes a drive command section 30 configured to issue, with respect to the drive control unit 20, a command to align the focus position to a predetermined position (e.g., +1 mm) toward the half mirror 5, and a high output command unit 42 configured to issue, with respect to the laser oscillator 11, a command to emit laser light toward the half mirror 5 with an output high enough to be used for laser machining (e.g., 3000 W). The processing condition correction unit 41 further includes a focus movement amount calculation section 43 configured to calculate a focus movement amount based on comparison of a first measurement value measured by the returning light measurement unit 4 within a laser emission initiation period in which the external optical system 12 is not warmed up and a second measurement value measured by the returning light measurement unit 4 within a fixed time elapse period in which the external optical system 12 is warmed up, and a focus position correction section 44 configured to correct the focus position of the processing condition based on the calculated focus movement amount. It should be noted that, while not necessary, the laser machining device 40 may further include a laser power correction section 45 configured to correct the laser power of the processing conditions based on a first measurement value measured by the returning light measurement unit 4 within a laser emission initiation period in which the external optical system 12 is not warmed up and a reference value (e.g., 14 W (=theoretical value 15 W×margin α (0.93))) preemptively stored in the storage unit 22. It should be noted that the reference value is based on the energy amount of the returning light when laser light is emitted, in a state where the external optical system 12 is not contaminated, toward the half mirror 5 such that the focus position of the laser light aligns with a predetermined position (e.g., +1 mm).

Figure 8:
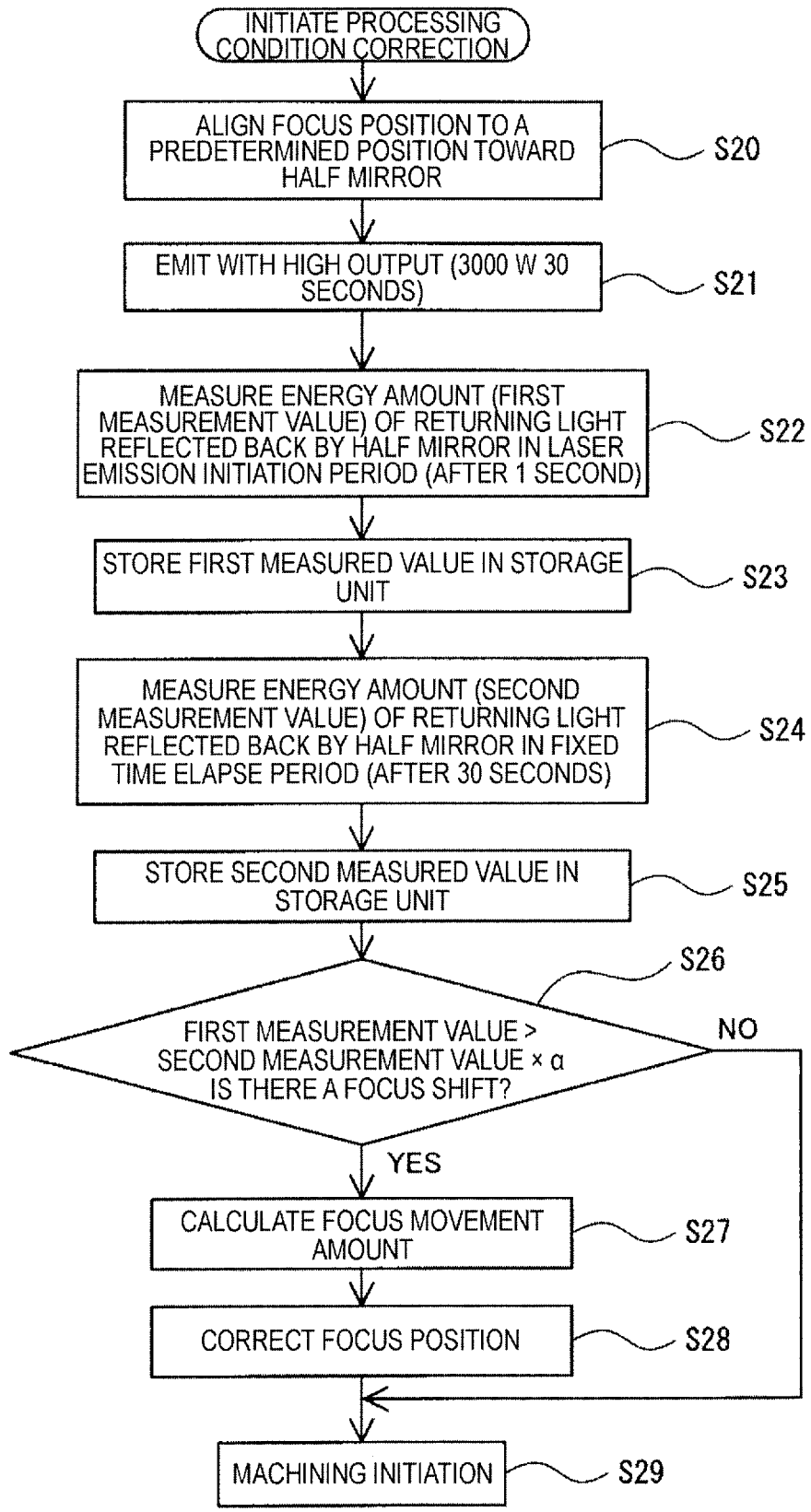
FIG. 8 is a flowchart illustrating the operation of the laser machining device according to another embodiment.

FIG. 8 is a flowchart illustrating the operation of the laser machining device 40 according to another embodiment. Hereinafter, the process of correcting processing conditions according to the contamination level of the external optical system will be described with reference to FIG. 7 and FIG. 8. When the processing condition correction unit 41 initiates correction of the processing conditions due to contamination of the external optical system prior to laser machining, in Step S20, the drive command section 30 issues, with respect to the drive control unit 20, a command to align the focus position to a predetermined position toward the half mirror 5. In Step S21, the high-output command section 42 issues, with respect to the laser oscillator 11, a command to emit laser light toward the half mirror 5 with a high output (e.g., 3000 W). In Step S22, the returning light measurement unit 4 measures, as the first measurement value, the energy amount of the returning light that is reflected back by the half mirror 5 within the laser emission initiation period (e.g., after 5 seconds) in which the external optical system 12 is not warmed up. It should be noted that, while not illustrated in the drawings, after Step S22, the laser power correction section 45 may correct the laser power of the processing conditions based on the first measured value measured by the returning light measurement unit 4 within the laser emission initiation period in which the external optical system 12 is not warmed up and a reference value preemptively stored in the storage unit 22 (e.g., 14 W). In Step S23, the storage unit 22 stores the first measurement value. In Step S24, the returning light measurement unit 4 measures, as the second measurement value, the energy amount of the returning light that is reflected back by the half mirror 5 within the fixed time elapse period (e.g., after 30 seconds) in which the external optical system 12 is warmed up. In Step S25, the storage unit 22 stores the second measurement value. In Step S26, the focus movement amount calculation section 43 calculates the focus movement amount by comparing the first measured value measured by the returning light measurement unit 4 within the laser emission initiation period and the second measurement value measured by the returning light measurement unit 4 within the fixed time elapse period. In Step S26, in cases where the first measurement value (e.g., 15 W) is larger than the value obtained by multiplying the second measurement value (e.g., 13 W) by the margin α (e.g., 1±0.07) (YES in Step S26), then in Step S27, the focus movement amount calculation section 43 calculates the focus movement amount (e.g., +1 mm). Next, in Step S28, the focus position correction section 44 corrects the focus position of the processing conditions (e.g., 0 mm is corrected to −1 mm). In Step S29, the laser machining device 40 initiates laser machining. In Step S26, in cases where the first measurement value (e.g., 15 W) is less than or equal to the value obtained by multiplying the second measurement value (e.g., 14.5 W) by the margin α (e.g., 1±0.07) (NO in Step S26), then the focus position is not corrected, and in Step S29, the laser machining device 40 initiates laser machining. According to the laser machining device 40, the focus position and laser power of the processing conditions can be corrected prior to laser machining according to the contamination level of the lens 1 and the window 2 by using a configuration that can be retrofitted for existing laser machining devices (such as the half mirror 5 and the laser light removal unit 14). As a result, as automatic operation can be continued without generating a large number of machining defects, the maintenance period of the external optical system 12 can be prolonged.

Figure 9:
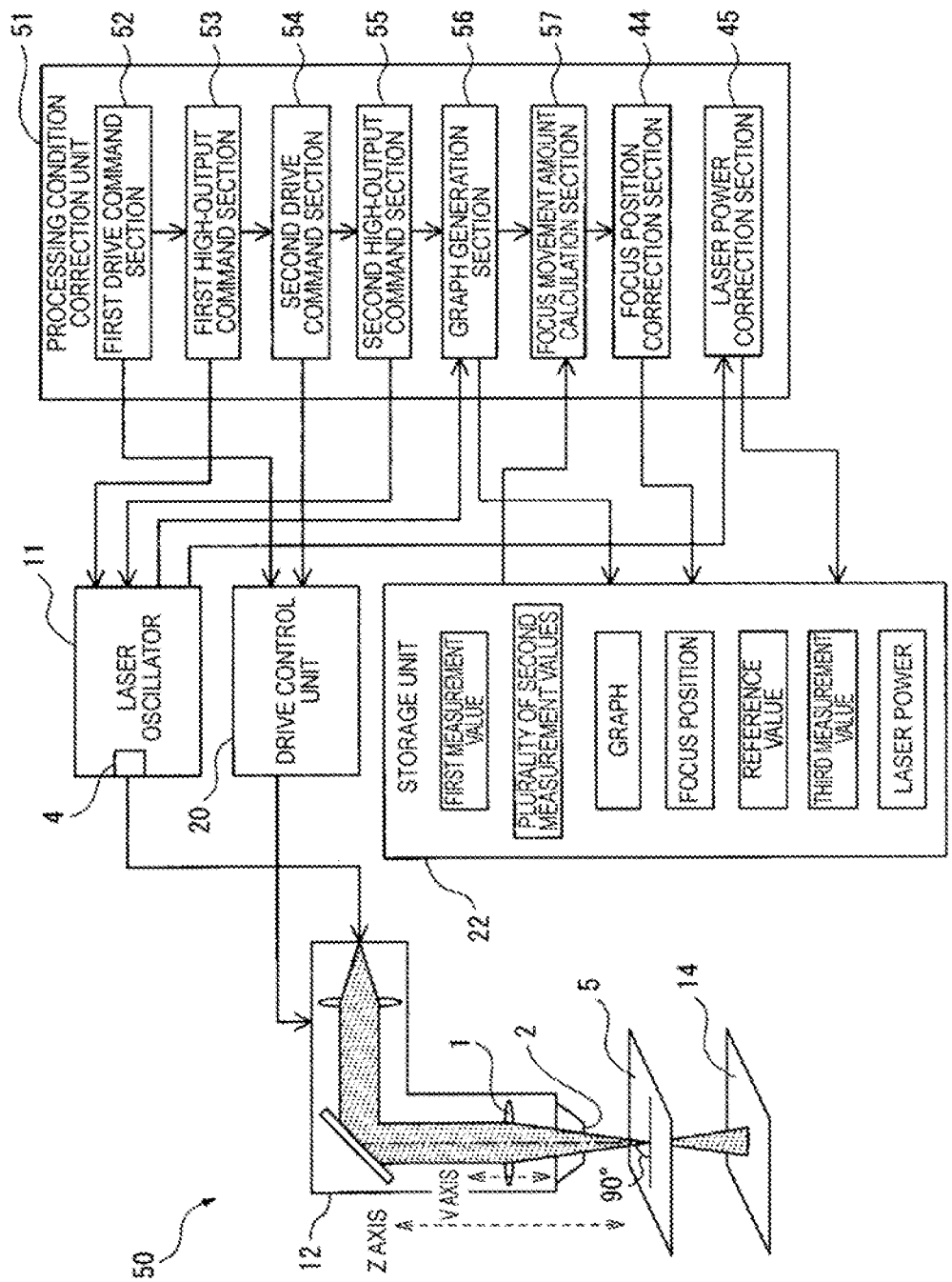
FIG. 9 is a block diagram illustrating a configuration of a laser machining device according to another embodiment.

FIG. 9 is a block diagram illustrating a configuration of a laser machining device 50 according to another embodiment. The laser machining device 50 has a processing condition correction unit 51 of a different configuration, and differs from the laser machining device 40 of FIG. 7 in that laser light is respectively emitted to focus positions that are aligned above and below the surface of the half mirror 5 to generate a graph including a plurality of measurement values respectively measured by the returning light measurement unit 4, and the focus movement amount is calculated based on the difference between the focus position calculated from the graph and the focus position commanded to be aligned on the surface of the half mirror 5.

The processing condition correction unit 51 includes a first drive command section 52 configured to issue, with respect to the drive control unit 20, a command to align the focus position on the surface of the half mirror 5 and a first high-output command section 53 configured to issue, with respect to the laser oscillator 11, a command to emit laser light toward the half mirror 5 with an output (e.g., 3000 W) high enough to be used for laser machining. The processing condition correction unit 51 further includes a second drive command section 54 configured to issue, with respect to the drive control unit 20, a command to move the focus position above and below the surface of the half mirror 5 and a second high-output command section 55 configured to issue, with respect to the laser oscillator 11, a command to respectively emit laser light in a state in which the focus position is aligned above and below. The processing condition correction unit 51 further includes a graph generation section 56 configured to generate a graph that includes the first measurement value measured in a state in which the focus position is aligned with the surface of the half mirror 5 and the plurality of second measurement values measured in a state in which the focus position is aligned above and below the surface of the half mirror 5, a focus movement amount calculation section 57 configured to calculate a focus position from the graph, and calculate a focus movement amount based on a difference between the calculated focus position and the focus position commanded to be aligned on the surface of the half mirror 5, and a focus position correction section 44 configured to correct the focus position of the processing condition based on the calculated focus movement amount. It should be noted that, while not necessary, the laser machining device 40 may further include a laser power correction section 45 configured to correct the laser power of the processing conditions based on a third measurement value measured by the returning light measurement unit 4 within a laser emission initiation period in which the external optical system 12 is not warmed up and a reference value (e.g., 14 W (=theoretical value 15 W×margin α (0.93))) preemptively stored in the storage unit 22. It should be noted that the reference value is based on the energy amount of the returning light when laser light is emitted, in a state where the external optical system 12 is not contaminated, such that the focus position aligns with the surface of the half mirror 5.

Figure 10:
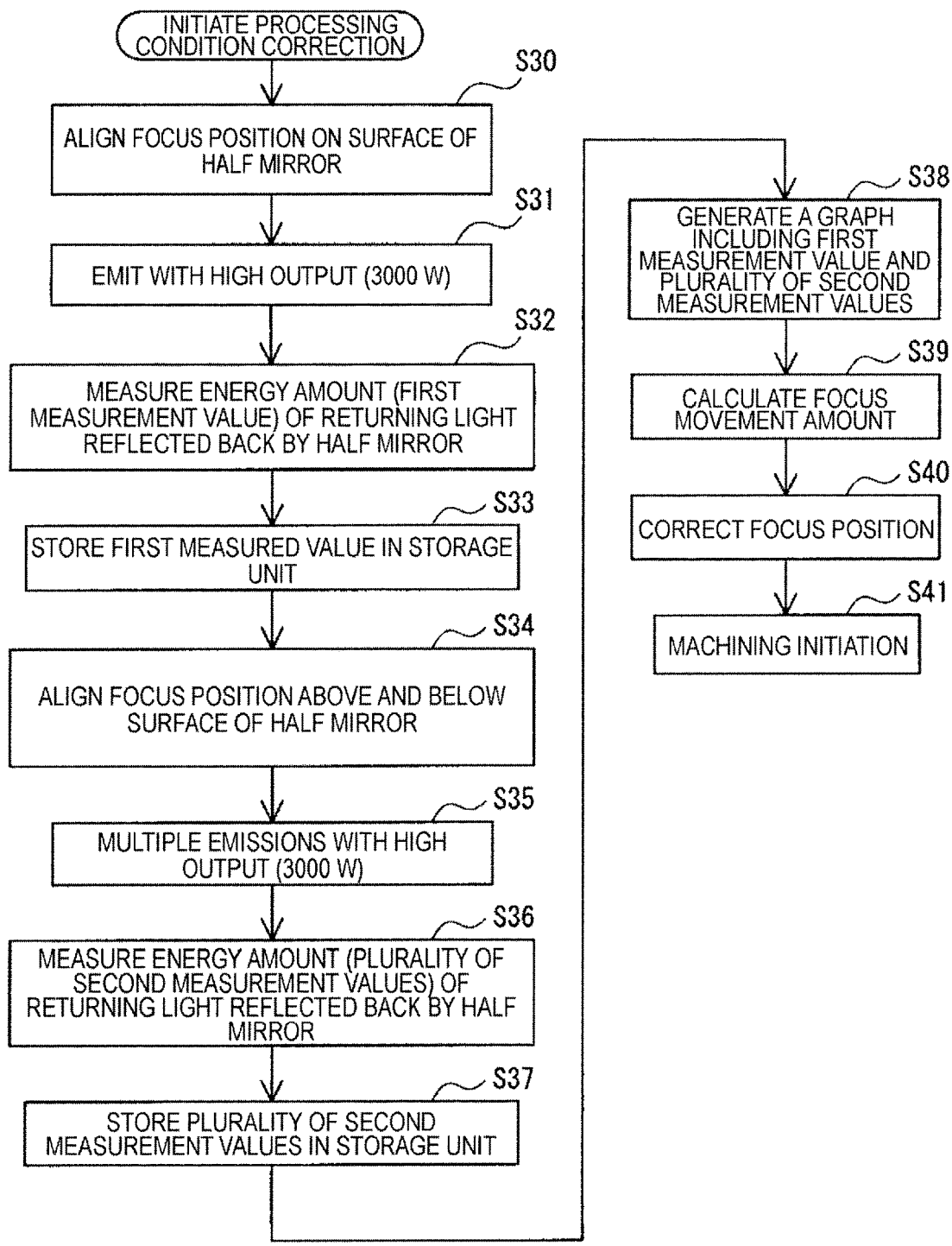
FIG. 10 is a flowchart illustrating the operation of the laser machining device according to another embodiment.

FIG. 10 is a flowchart illustrating the operation of the laser machining device 50. Hereinafter, the process of correcting processing conditions according to the contamination level of the external optical system will be described with reference to FIG. 9 and FIG. 10. When the processing condition correction unit 51 initiates correction of the processing conditions before laser machining, in Step S30, the first drive command section 52 issues, with respect to the drive control unit 20, a command to align the focus position to the surface of the half mirror 5. In Step S31, the first high-output command section 53 issues, with respect to the laser oscillator 11, a command to emit laser light toward the half mirror 5 with an output high enough to be used for laser machining (e.g., 3000 W). In Step S32, the returning light measurement unit 4 measures, as the first measurement value, the energy amount of the returning light that is reflected by the half mirror 5 and returning to the laser machining device. It should be noted that, while not illustrated in the drawings, after Step S32, the laser power correction section 45 may correct the laser power of the processing conditions based on the third measured value measured by the returning light measurement unit 4 within the laser emission initiation period in which the external optical system 12 is not warmed up and a reference value preemptively stored in the storage unit 22 (e.g., 14 W). In Step S33, the storage unit 22 stores the first measurement value. In Step S34, the second drive command section 54 issues, with respect to the drive control unit 20, a command to move the focus position above and below the surface of the half mirror 5. In Step S35, the second high-output command section 55 issues, with respect to the laser oscillator 11, a command to respectively emit high-output laser light (e.g., 3000 W) in a state in which the focus position is aligned above and below. In Step S36, the returning light measurement unit 4 measures, as the plurality of second measurement values, each energy amount of the returning light that is reflected by the half mirror 5 and returning to the laser machining device. In Step S37, the storage unit 22 stores the plurality of second measurement values. In Step S38, the graph generation section 56 generates a graph that includes a first measurement value measured in a state in which the focus position is aligned with the surface of the half mirror 5 and a plurality of second measurement values measured in a state in which the focus position is aligned above and below the surface of the half mirror 5. In Step S39, the focus movement amount calculation section 57 calculates a focus position from the graph, and calculates a focus movement amount based on the difference between the calculated focus position and the focus position commanded to be aligned on the surface of the half mirror 5. In Step S40, the focus position correction section 44 corrects the focus position of the processing conditions based on the calculated focus movement amount. In Step S41, the laser machining device 50 initiates laser machining. According to the laser machining device 50, the focus position and laser power of the processing conditions can be corrected prior to laser machining according to the contamination level of the lens 1 and the window 2 by using a configuration that can be retrofitted for existing laser machining devices (such as the half mirror 5 and the laser light removal unit 14). As a result, as automatic operation can be continued without generating a large number of machining defects, the maintenance period of the external optical system 12 can be prolonged.

Figure 11A:
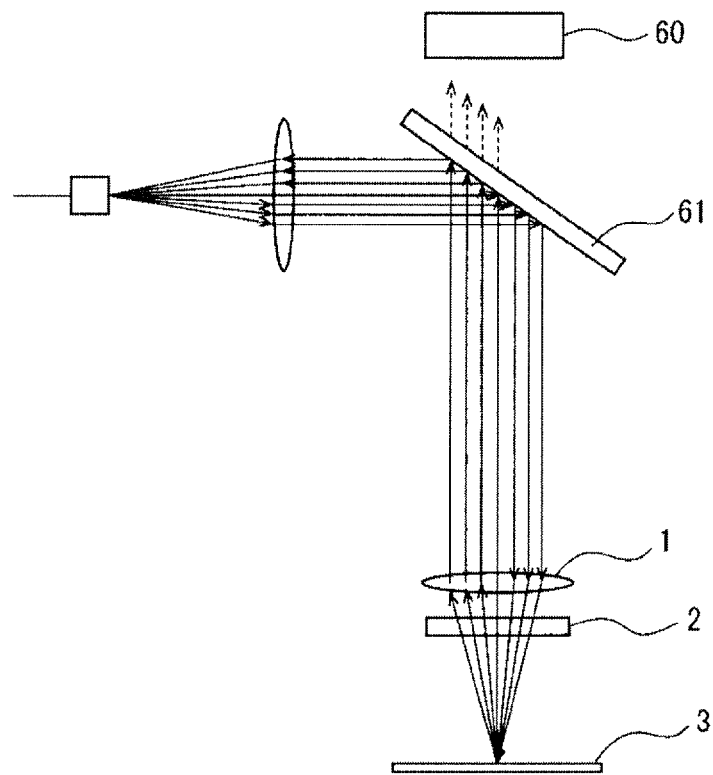
FIG. 11A is a layout diagram illustrating an arrangement of a returning light measurement unit according to still another embodiment.
Figure 11B:
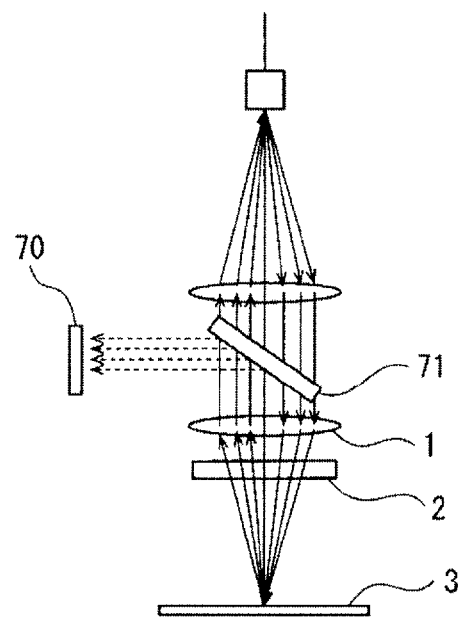
FIG. 11B is a layout diagram illustrating an arrangement of the returning light measurement unit according to still another embodiment.

FIG. 11A and FIG. 11B are layout diagrams illustrating the arrangements of the returning light measurement units 60 and 70 according to still another embodiment. Unlike existing returning light measurement units 4 that are disposed inside the laser oscillator, the returning light measurement units 60 and 70 are disposed inside the external optical system. The returning light measurement unit 60 illustrated in FIG. 11A measures returning light transmitted through a half mirror 61 disposed at an angle of 45° with respect to the optical axis at the folded portion of the L-shaped machining head. The returning light measurement unit 70 illustrated in FIG. 11B measures returning light reflected by a half mirror 71 disposed at an angle of 45° with respect to the optical axis between the focusing lens 1 and the collimation lens 6 in the linear machining head. As the returning light measurement unit 60 or 70 is disposed inside the external optical system, this configuration is relatively easy to retrofit, and is particularly advantageous when existing returning light measurement units 4 cannot be used.

It should be noted that the response speed of the returning light measurement units 4, 60, and 70 are preferably less than or equal to 20 μs. Generally, in hole drilling machining where a relatively large amount of returning light is generated by high-output laser emission, it takes approximately 100 μs to drill a workpiece having a thickness of 1 mm, but in a case where the emission time is a short time of approximately 100 μs, it is understood that the laser oscillator 11 is not damaged even with high-output laser emission. Also, in general, as the measurement values measured by the returning light measurement units 4, 60, and 70 include noise, they are calculated by averaging the measurement values of several points (e.g., 5 points). Considering these two background factors, since the response speed of the returning light measurement units 4, 60, and 70 are 20 μs or less (=100 μsec÷5), even in a case where a relatively large amount of returning light is generated by high-power laser emission, it is possible to correct the processing conditions according to the contamination level of the external optical system without damaging the laser oscillator.

The computer-executable program in the above-described embodiments can be provided by being recorded in a computer-readable non-transitory recording medium, a CD-ROM, or the like. While various embodiments have been described in the present specification, it should be recognized that the present invention is not limited to the various embodiments described above, and various modifications can be made within the scope of the following claims.

The invention claimed is:

1. A laser machining device configured to laser machine a workpiece after correcting a processing condition in accordance with a contamination level of an optical system, the laser machining device comprising:
   a laser oscillator;
   an external optical system configured to guide laser light from the laser oscillator and focus the laser light on the surface of a workpiece;
   a driver configured to move a focus position of the laser light emitted from the external optical system;
   a reflection plate disposed perpendicularly to an optical axis of the laser light and having a constant reflectance with respect to the laser light;
   a returning light measurement sensor configured to measure an energy amount of returning light reflected by the reflection plate and returning to the laser machining device;
   a memory configured to store a reference value based on the energy amount of the returning light when laser light is emitted, in a state where the external optical system is not contaminated, toward the reflection plate with a predetermined output low enough not to melt or deform the reflection plate such that the focus position of the laser light aligns with a predetermined position; and
   a processor configured to correct, prior to laser machining, a processing condition in accordance with the contamination level of the external optical system,
   wherein the processor is configured to:
      issue, with respect to the driver, a command to align the focus position to a position identical to the predetermined position toward the reflection plate,
      issue, with respect to the laser oscillator, a command to emit laser light toward the reflection plate with a low output identical to the predetermined output, and
      correct the laser power of the processing condition based on the measurement value measured by the returning light measurement sensor and the reference value.

2. The laser machining device of claim 1, wherein the returning light measurement sensor is disposed inside the external optical system.

3. The laser machining device of claim 1, wherein the returning light measurement sensor is disposed inside the laser oscillator.

4. A laser machining device configured to laser machine a workpiece after correcting a processing condition in accordance with a contamination level of an optical system, the laser machining device comprising:
  a laser oscillator;
  an external optical system configured to guide laser light from the laser oscillator and focus the laser light on the surface of a workpiece;
  a driver configured to move a focus position of the laser light emitted from the external optical system;
  a half mirror disposed perpendicularly to an optical axis of the laser light and having a constant reflectance with respect to the laser light;
  a laser light removal unit configured to remove laser light transmitted through the half mirror;
  a returning light measurement sensor configured to measure an energy amount of returning light reflected by the half mirror and returning to the laser machining device; and
  a processor configured to correct, prior to laser machining, a processing condition in accordance with the contamination level of the external optical system;
  wherein the processor is configured to:
    issue, with respect to the driver, a command to align the focus position to a predetermined position toward the half mirror,
    issue, with respect to the laser oscillator, a command to emit laser light toward the half mirror with an output high enough to be used for laser machining,
    calculate a focus movement amount based on comparison of a first measurement value measured by the returning light measurement sensor within a laser emission initiation period in which the external optical system is not warmed up and a second measurement value measured by the returning light measurement sensor within a fixed time elapse period in which the external optical system is warmed up, and
    correct the focus position of the processing condition based on the calculated focus movement amount.

5. The laser machining device of claim 4, further comprising:
  a memory configured to store a reference value based on the energy amount of the returning light when laser light is emitted, in a state where the external optical system is not contaminated, toward the half mirror such that the focus position of the laser light aligns with a position identical to the predetermined position;
  wherein the processor is further configured to:
    correct the laser power of the processing condition based on the first measurement value measured by the returning light measurement sensor within a laser emission initiation period in which the external optical system is not warmed up and the reference value.

6. A laser machining device configured to laser machine a workpiece after correcting a processing condition in accordance with a contamination level of an optical system, the laser machining device comprising:
  a laser oscillator;
  an external optical system configured to guide laser light from the laser oscillator and focus the laser light on the surface of a workpiece;
  a driver configured to move a focus position of the laser light emitted from the external optical system;
  a half mirror disposed perpendicularly to an optical axis of the laser light and having a constant reflectance with respect to the laser light;
  a laser light removal unit configured to remove laser light transmitted through the half mirror;
  a returning light measurement sensor configured to measure an energy amount of returning light reflected by the half mirror and returning to the laser machining device; and
  a processor configured to correct, prior to laser machining, a processing condition in accordance with the contamination level of the external optical system;
  wherein the processor is configured to:
    issue, with respect to the driver, a command to align the focus position on the surface of the half mirror,
    issue, with respect to the laser oscillator, a command to emit laser light toward the half mirror with an output high enough to be used for laser machining,
    issue, with respect to the driver, a command to move the focus position above and below from the surface of the half mirror,
    issue, with respect to the laser oscillator, a command to respectively emit laser light in a state in which the focus position is aligned above and below,
    generate a graph that includes a first measurement value measured in a state in which the focus position is aligned with the surface of the half mirror and a plurality of second measurement values measured in a state in which the focus position is aligned above and below the surface of the half mirror,
    calculate a focus position from the graph, and calculate a focus movement amount based on a difference between the calculated focus position and the focus position commanded to be aligned on the surface of the half mirror, and
    correct the focus position of the processing condition based on the calculated focus movement amount.

7. The laser machining device of claim 6, further comprising:
  a memory configured to store a reference value based on the energy amount of the returning light when laser light is emitted, in a state where the external optical system is not contaminated, such that the focus position of the laser light aligns with the surface of the half mirror;
  wherein the processor is further configured to:
    correct the laser power of the processing condition based on a third measurement value measured by the returning light measurement sensor within a laser emission initiation period in which the external optical system is not warmed up and the reference value.

* * * * *